US00RE36058E

United States Patent [19]

Sokol

[11] E Patent Number: Re. 36,058

[45] Reissued Date of Patent: Jan. 26, 1999

[54] MULTI-ELEMENT WHEEL ALIGNMENT SHIM ASSEMBLY, AND METHOD OF USE

[75] Inventor: Gary L. Sokol, Longmont, Colo.

[73] Assignee: Ingalls Engineering Company, Inc., Longmont, Colo.

[21] Appl. No.: 786,863

[22] Filed: Jan. 22, 1997

Related U.S. Patent Documents

Reissue of:

[64] Patent No.: 5,383,678
Issued: Jan. 24, 1995
Appl. No.: 110,291
Filed: Aug. 20, 1993

[51] Int. Cl.[6] ..... B62D 17/00

[52] U.S. Cl. ..... 280/661

[58] Field of Search ..... 280/661

[56] References Cited

U.S. PATENT DOCUMENTS

| | | | |
|---|---|---|---|
| 774,042 | 11/1904 | Cooper | 280/661 |
| 4,037,680 | 7/1977 | Grove et al. | 280/661 |
| 4,195,862 | 4/1980 | Specktor et al. | 280/661 |
| 4,684,150 | 8/1987 | Specktor et al. | 280/661 |
| 4,872,699 | 10/1989 | Grove et al. | 280/661 |
| 5,098,117 | 3/1992 | Specktor et al. | 280/661 |

FOREIGN PATENT DOCUMENTS

| | | |
|---|---|---|
| 685961 | 5/1964 | Canada . |
| 383551 | 11/1932 | United Kingdom . |
| 1604014 | 12/1981 | United Kingdom . |

OTHER PUBLICATIONS

Judgement of the United States Patent Office Board of Patent Appeals and Interferences in Interference No. 103,634 (Sokol v. Schlosser et al), Mailed Aug. 13, 1996 (Paper No. 39).

U.S. application No. 08/054,411; A Device and Method for Adjusting Camber and/or Toe; By Schlosser et al.; Filed Apr. 28, 1993.

U.S. application No. 07/911,464; Apparatus and Method for Adjusting Camber and Toe; By Schlosser et al.; Filed Jul. 10, 1992.

No. 808 Cam Plates Installation Instructions; 1984; By Ingalls Engineering Company, Inc., Longmont, Colorado.

*Primary Examiner*—Kenneth R. Rice
*Attorney, Agent, or Firm*—Harold A. Burdick

[57] ABSTRACT

Shim assembly configured to be positioned in a wheel assembly to correct alignment and formed of a plurality of flat, tapered elements securable together and positionally adjustable one relative to the other with selectable orientation of the tapers, preferably rotatably secured for mutual angular movement of the elements around an axis, indicia to display the angular relationship of the elements and of the shim assembly orientation, such that the taper of the elements add or subtract to establish the overall composite taper of the shim assembly with the indicia displaying such composite taper and/or providing orientation points for positioning of the shim assembly in a wheel assembly to correct alignment.

15 Claims, 11 Drawing Sheets

MULTI-ELEMENT WHEEL ALIGNMENT SHIM ASSEMBLY, AND METHOD OF USE

Matter enclosed in heavy brackets [ ] appears in the original patent but forms no part of this reissue specification; matter printed in italics indicates the additions made by reissue.

Background of the Invention

1. Field of the Invention

The present invention relates broadly the wheel alignment for vehicles, and more particularly to tapered shim elements configured to be secured together into a shim assembly which can be positioned as a single, unitary component to alter and correct the relative position of an axle or spindle and, ultimately, of a wheel carried on such axle or spindle.

2. Related Art

The concept of utilizing one or more thin, identical tapered shim elements interposed substantially perpendicular to the axis of an axle or spindle is old and well developed. Much effort has been expended with limited success to minimize the differing embodiments of such shim elements required to fit numerous vehicle models and to provide fine and accurate correction of a wide range of misalignment conditions. Also, emphasis has been placed at simplifying both selection of the appropriate corrective taper and actual installation of the tapered shim element under confined and difficult circumstances.

Such tapered shim elements are employed in two fundamentally differing but related vehicle structures, i.e. at a steerable front wheel, and at a fixed rear wheel. When used at a steerable wheel, the tapered shim element can be rotated around the wheel axis when adjusting camber such that the taper is orthogonally resolved into camber and toe components. When the appropriate camber correction is realized, the toe component can be easily accommodated by the toe correction mechanism provided at steerable wheels, i.e. tie rod length adjustment. However, at fixed rear wheels the toe and camber must both be set by selecting a tapered shim element of just the proper taper, and resolving the camber and toe components to precisely correct both of the alignment settings. In practice this means the shim element must have a single proper taper, and that such taper must be properly oriented relative to toe and camber. Otherwise, two independent shim elements may be needed and stacked with the taper of one shim element oriented to correct toe and with the taper of the other oriented to correct camber.

U.S. Pat. Nos. 4,037,680 and 4,195,862 describe tapered shim elements adapted to correct the camber of driven, steerable wheels. Each describes a selection of tapered shim elements from which a choice can be made to correct wheel camber. The latter patent discusses color coded, filled polymer shim elements which seal when stacked with the taper axis (that which extends from the thin to the thick end of the shim element) in a vertical alignment.

U.S. Pat. No. 4,684,150 describes a set of twelve shim elements, each of a different taper, which have a series of notches at the periphery thereof. By selecting a shim element of an appropriate taper, and by positioning the shim element with the appropriate vertical orientation, both camber and toe can be corrected. The open notches allow the shim element to be repositioned without complete removal of the wheel mount. For greater correction, the shim elements can be stacked.

U.S. Pat. No. 4,872,699 discloses a set of shim elements of differing tapers having a series of frangible tabs around the periphery thereof. By breaking out selected tabs the shim elements can be configured to fit bolt patterns with differing vertical orientations of the shim elements. A comprehensive template system for determining breakout patterns is presented.

Ingalls Alignment Products has marketed a set of "808 Shims" consisting of two identical one and one-half degree tapered shim elements for use with fixed rear wheels. For corrections requiring other than a single one and one-half degree shim element, two individual shim elements are installed stacked in accord with a chart utilizing numerical markings imprinted in each shim element.

U.S. Pat. No. 774,042 discusses an early attempt to use two independent tapered members to correct alignment. However, no means for correlating measured misalignment and tapered member setting are suggested. Thus the concept, which appears to rely on eyeball corrections, would not be appropriate for modern vehicles.

SUMMARY OF THE INVENTION

The present invention involves an adjustable tapered shim assembly, as opposed to one or more individual shim elements, in which a plurality -preferably two- tapered shim elements are or can be secured together to form a preselected composite taper as a shim assembly. A much preferred embodiment includes a securing the shim elements together while providing for relative rotary movement. Each shim element is functionally defined by two planar surfaces, comprising at least a portion of a shim element side, which define an angle between the planes of greater than zero. The elements, which are preferably circular, are joined with planes abutting and preferably rotatable around an axis at or near the centers of the planes, preferably concentrically. Each surface may be divided into offset subsurfaces complementary to corresponding subsurfaces on the other shim element. Thus the shim assembly may be variably adjusted through a range of tapers by rotating the elements, either while connected or prior to securing the elements together, such that the respective tapers add or subtract one to or from the other. Optionally, releasable stops can be provided to position the elements with a predetermined composite taper of the shim assembly. To assist in releasing the stops, textured areas may be provided to indicate the proper hand position for adjusting the shim assembly. Indicia means may be included to display the amount of composite shim assembly taper as well as orientation of the taper. Thus, in use, a vehicle wheel can be measured to determine the degree of toe and camber correction required. Then, using an expansive manual lookup chart, or more conveniently a computer algorithm, the assembly taper and orientation necessary for the correction can be determined (preferable in terms of the indicia on the shim assembly). In view of the power of the subject invention to cover a wide array of vehicle models, it may be desirable to employ an algorithm which calculates composite tapers and positions using trigonometric functions rather than using a computer version of the manual lookup chart. Once the two variables are established, it is a simple matter to install the preset assembly in the vehicle in the appropriate predetermined orientation. A single shim assembly can correct a full range of misalignments for a large range of vehicles in a simple, convenient process.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 4:
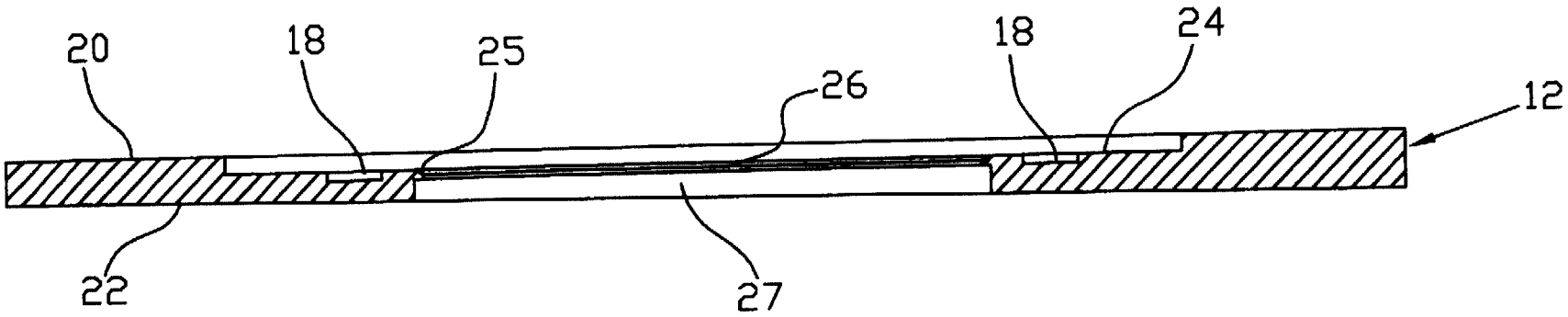
FIG. 4 is a section view along section line [A—A] *4—4* of the first tapered shim element shown in FIG. 3.

Turning now to the drawings, wherein like components are designated by like reference numerals throughout the various figures and embodiments, a shim assembly according to a particularly preferred embodiment of the invention is illustrated in FIGS. 1 through 7 and FIG. 12, and is generally designated by the reference numeral 10. Shim assembly 10 is formed in part of a first tapered shim element 12 illustrated in more detail in FIGS. 3 and 4. As shown therein, first tapered shim element 12 is circular in shape around an axis 13 with a number of openings 14 defined therethrough in a circumferential pattern. Openings 14 are elongated in the circumferential direction to fit vehicle bolt arrangements having differing horizontal spacing at different pairs of connectors. Also defined on first tapered shim element 12 are taper indicia means 15 and shim assembly orientation indicia means 16. Orientation indicia means 16 are preferably positioned to indicate the top of tapered shim assembly 10, but alternatively can be positioned adjacent an opening 14 which is thus identified as that which receives a vehicle bolt 56 shown in FIG. 12. Shim assembly 10 is designed to accommodate many vehicle models and thus may not always receive bolt 56 in the same opening 14. However, the top or uppermost, position of shim assembly 10 is a constant that does not change with vehicle design as bolt patterns may. Ramp-sided detents 18 are formed in a concentric, circumferential pattern in first tapered shim element 12. And, as shown in FIG. 4, first tapered shim element 12 is formed with a planar front surface 20, which is concentric to axis 13, and a planar rear surface 22 which are nonparallel and define the taper of first tapered shim element 12. Sunken surface 24 is centrally defined in a circular shape and concentric to axis 13 in front surface 20 of first tapered shim element 12. Lip 25 and associated ramp portion 26 define central opening 27, inside of openings 14, which extends through first tapered shim element 12.

Figure 1:
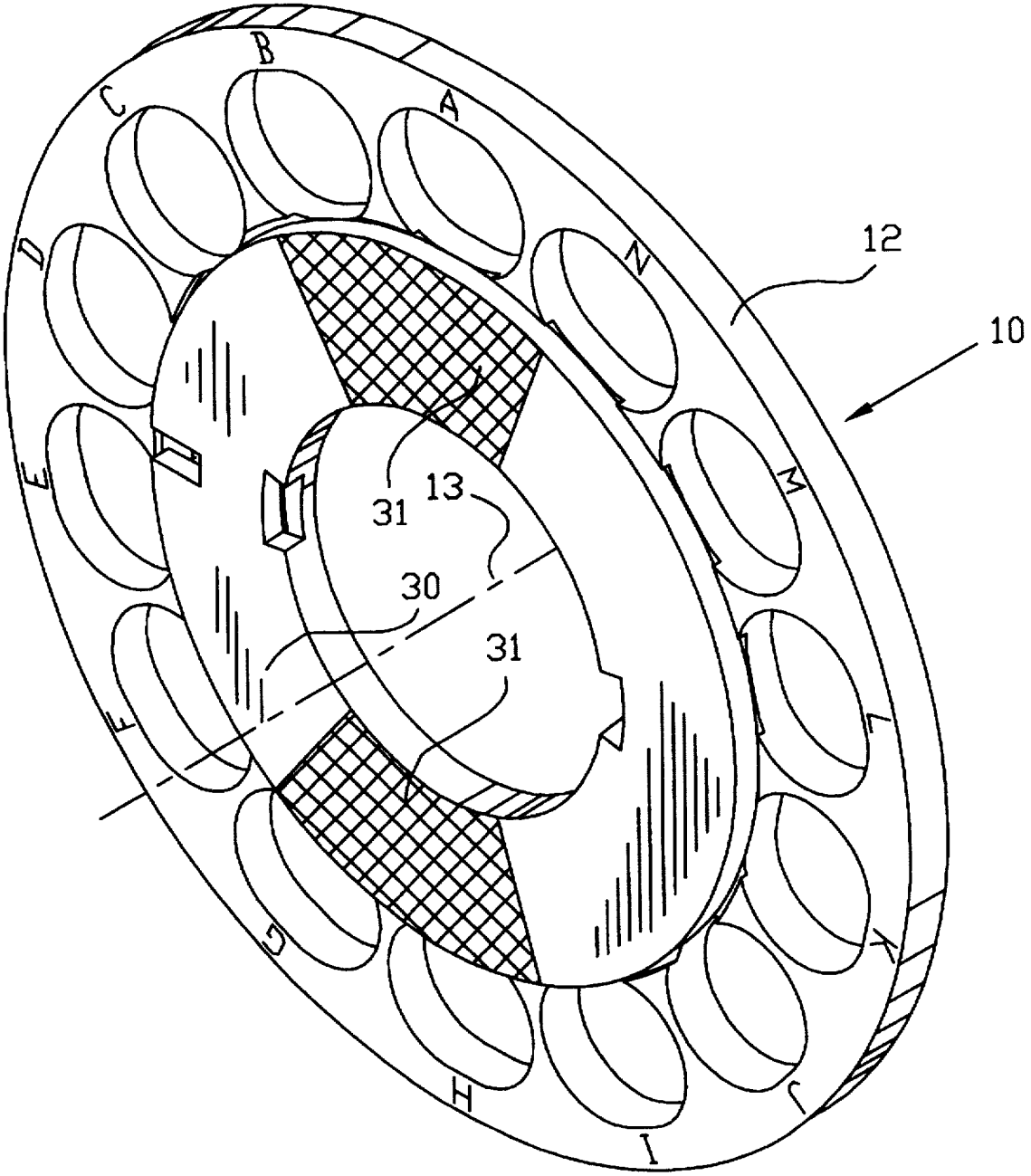
FIG. 1 is a perspective view of a preferred shim assembly in accord with the instant invention.
Figure 2:
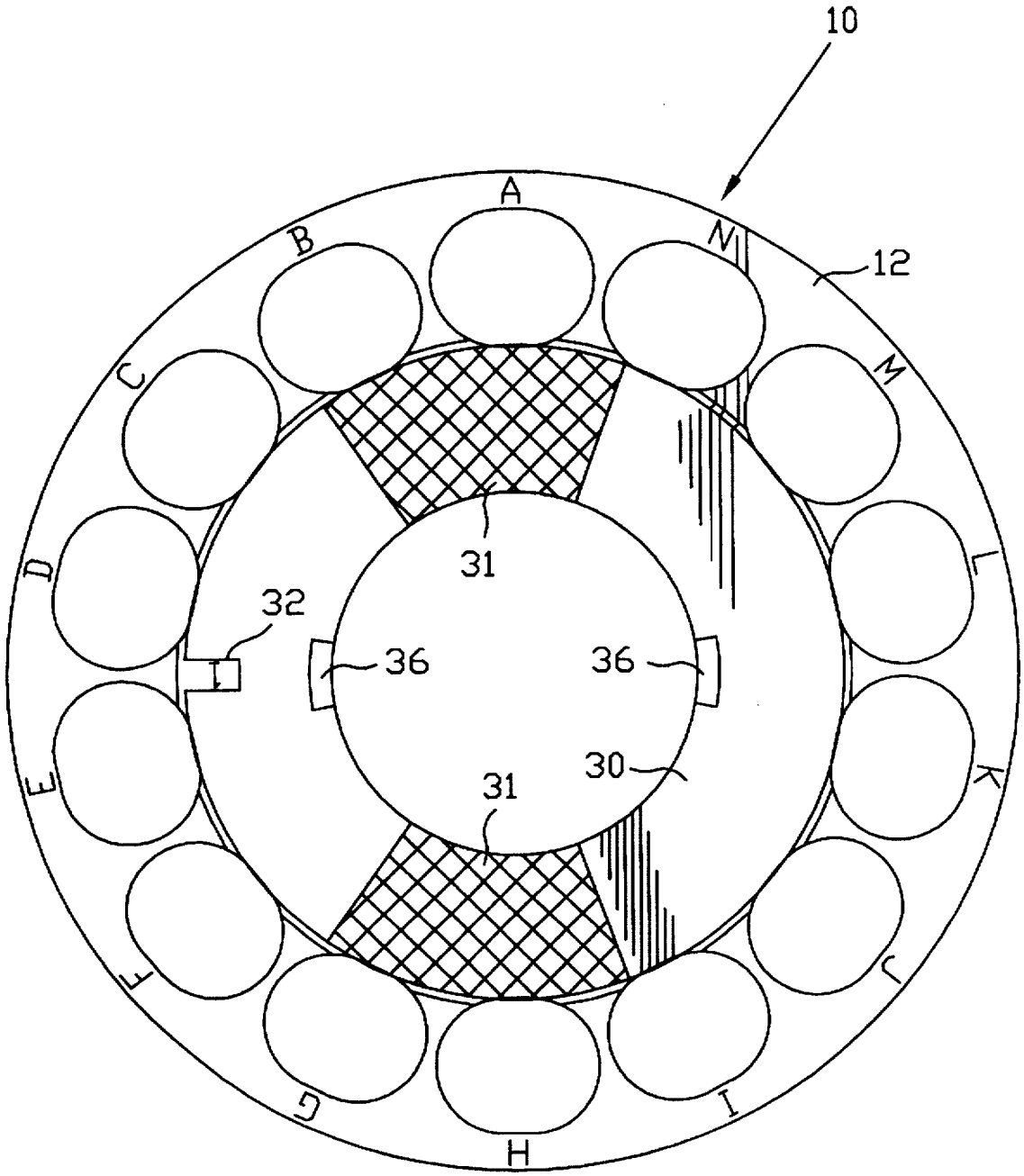
FIG. 2 is a front view of the preferred shim assembly of the embodiment of FIG. 1.
Figure 3:
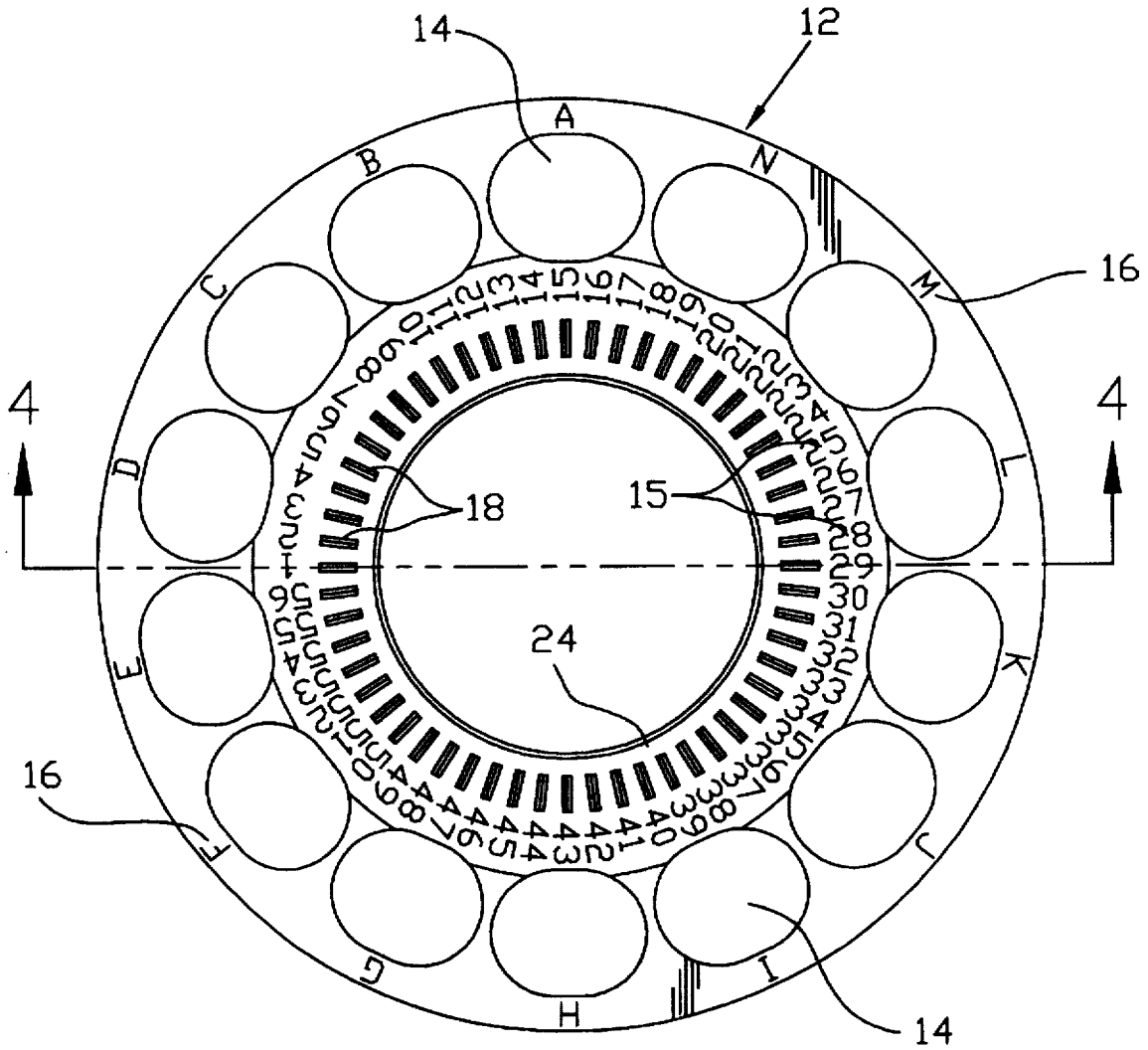
FIG. 3 is a front view of a first tapered shim element of the shim assembly shown in FIG. 1 and FIG. 2.
Figure 5:
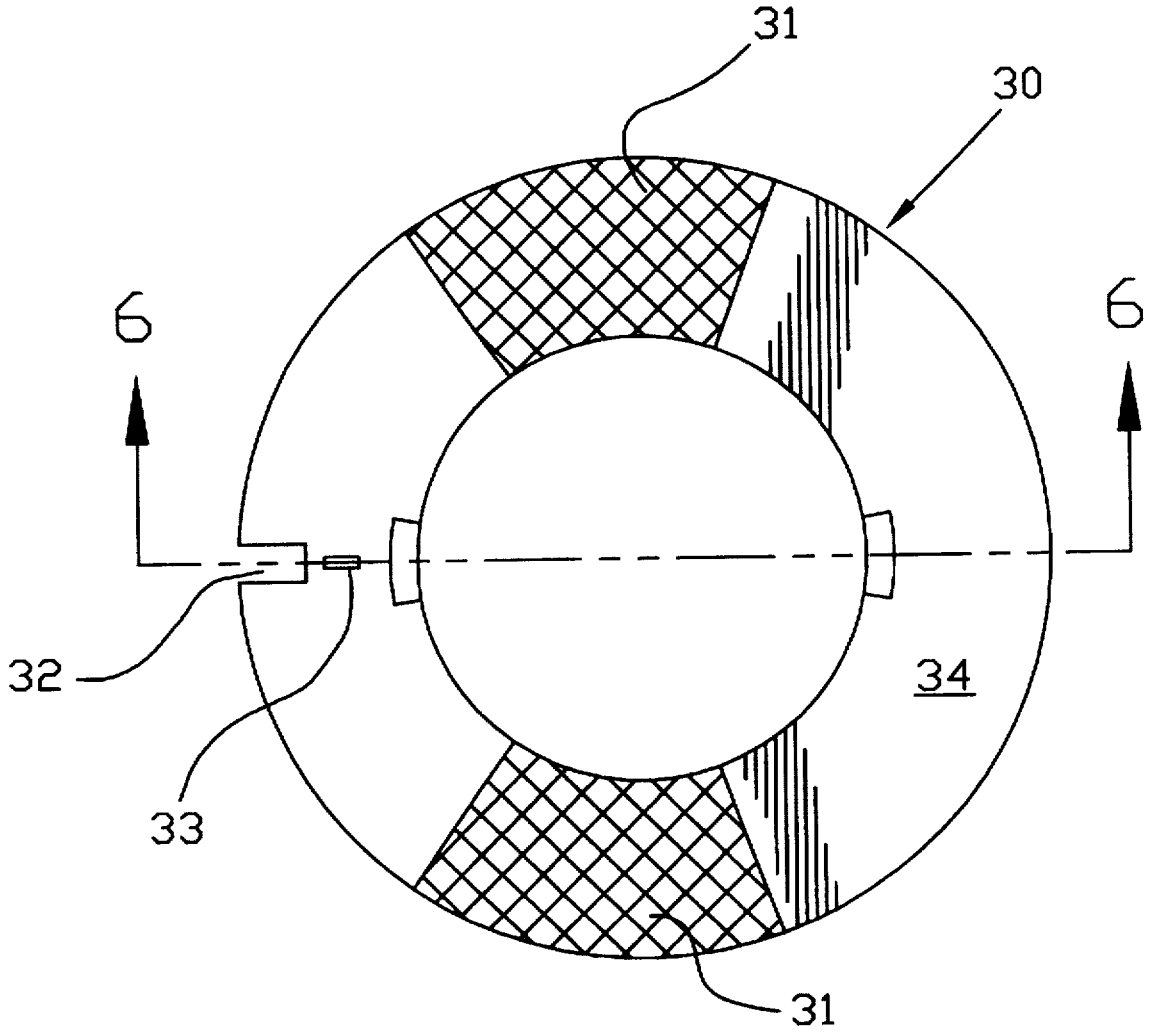
FIG. 5 is a front view of a second tapered shim element of the shim assembly shown in FIG. 1 and FIG. 2.
Figure 6:
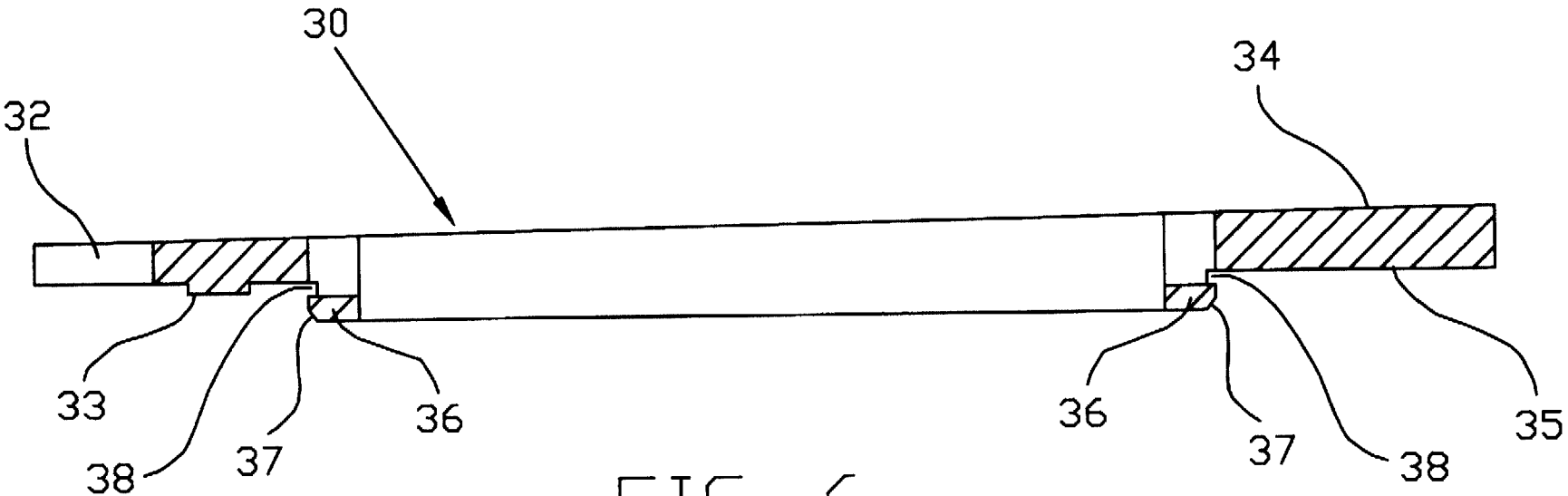
FIG. 6 is a section view along section line [B—B] *6—6* of the second tapered shim element shown in FIG. 5.
Figure 7:
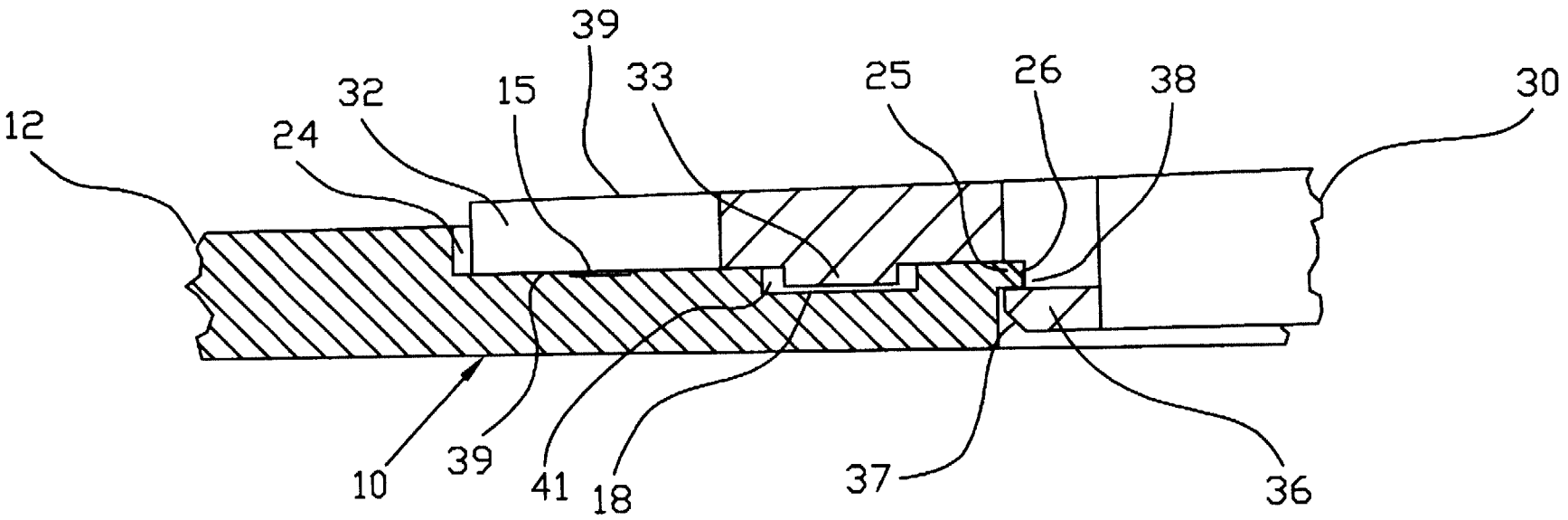
FIG. 7 is a detailed sectioned view of the rotatable snap connection between the first and second elements shown in FIGS. 2 through 6.

Shim assembly 10 also includes second tapered shim element 30 which, as illustrated in FIGS. 5 and 6, is circular in shape and of a diameter as to nest within sunken surface 24 inside of openings 14 of first tapered shim element 12 and concentric with axis 13. Textured engaging areas 31 are defined in the front surface 34 of second shim element 30 to indicate the proper position at which to hold shim assembly 10 while adjusting it. Indicator 32 is defined through second tapered shim element 30 and spaced to display taper indicia means 15 as shown in FIG. [1] *7*. Dog 33, in the form of a V-shaped projection, extends from the rear surface 35 of shim element 30, and is radially spaced on second tapered shim element 30 to engage detents 18 of first tapered shim element 12 when assembled as shown in FIG. 1 and FIG. 7. Textured engaging areas 31 are spaced from the position of dog 33 such that pressure applied at textured areas 31 will not force dog 33 into detents 18, thus allowing relative rotation of tapered shim elements 12 and 30. Upon application of a mutual torque between first tapered shim element 12 and second tapered shim element, dog 33 moves up the ramp-sided walls of detent 18 and is repositioned in an adjacent detent 18. Thus mutual rotation of first tapered shim element 12 and second tapered shim element 30 may be continued until a reaching a desired setting whereupon dog 33 is allowed to engage a detent 18 thus preserving the setting.

Nonparallel front surface 34 and rear surface 35 are shown in FIG. 6 as are opposed connectors 36, each of which has defined thereon ramp 37 and groove 38. As depicted in FIG. 7, first tapered shim element 12 and second tapered shim element 30 are attached together by connecting means rotatably securing first shim element 12 to second shim element 30, preferably by inserting connectors 36 of second tapered shim element 30 into central opening 27 of first tapered shim element 12 such that lip 25 of the latter is positioned in groove 38 of the former. Ramp 37 bearing against ramp portion 26 of lip 25 serves to displace connectors 36 to facilitate such insertion. Thus shim element 12 bears at sunken surface 24 against complementary, parallel surface 35 of second shim element 30, both surfaces 24 and 35 being in extended planes (not shown) concentric to and preferably perpendicular to axis 13. If such planes were not perpendicular, radial forces could be produced which would unnecessarily stress shim assemble 10. As shown, dog 33 fits into detents 18 to form releasable locking means 41 which releasably position first tapered shim element 12 relative to second tapered shim element 30 in predetermined positions which are identified by shim assembly taper display means 39, such as taper indicia means 15 at indicator window 32. Central opening 27 is preferably through first tapered shim element 12 to ease tooling requirements, but central opening 27 could operable be a blind opening.

Figure 8:
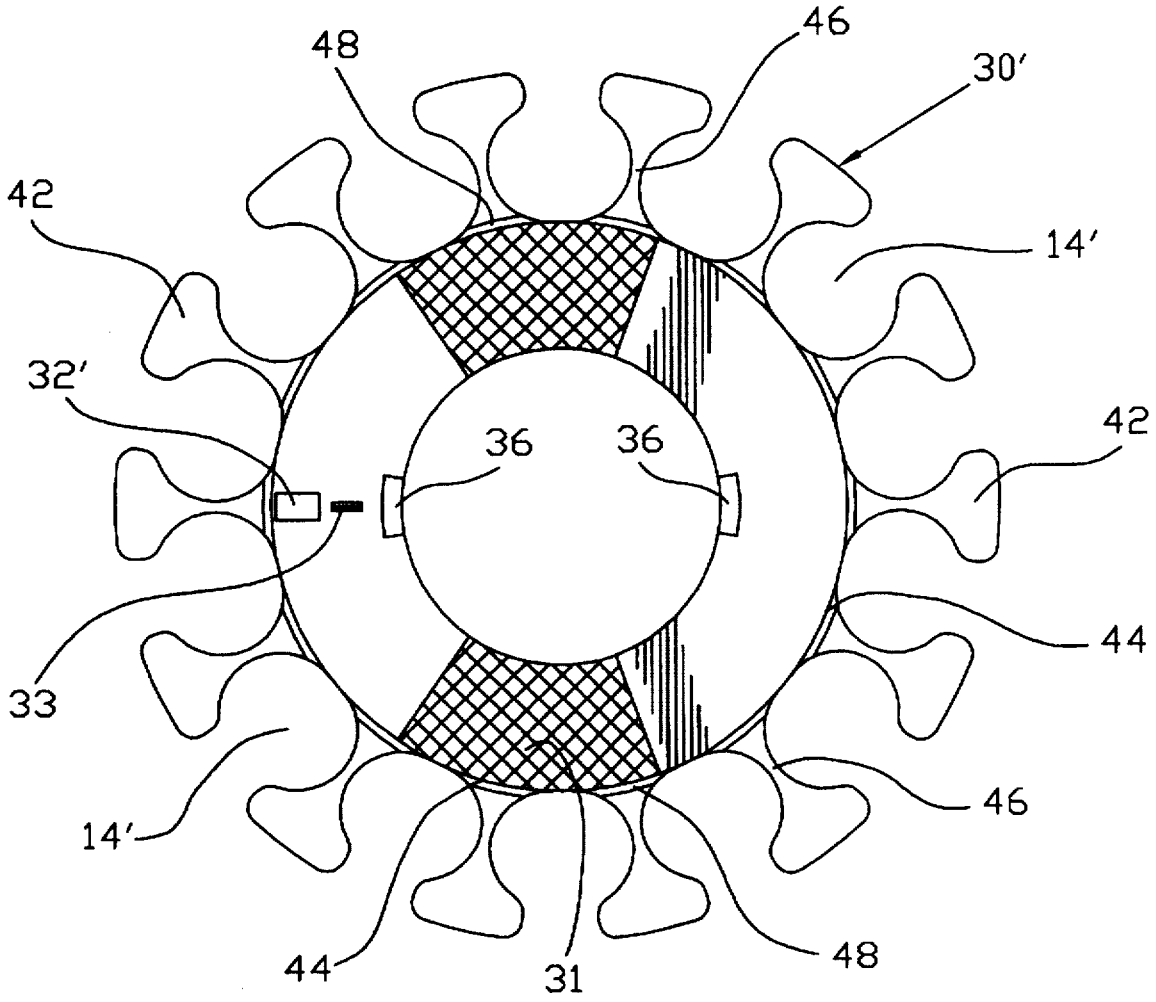
FIG. 8 is an alternative second tapered shim element similar to that shown in FIG. 5.

While the embodiment of FIG. 1 is to be preferred in most respects, a portion of the industry desires a "full coverage" design in which the entire shim extends over a maximum amount of the area of the surfaces between which it is inserted. This is viewed as a cosmetic concern in that the area of shim assembly 10 has been shown by finite element analysis to be more than adequate to support the pressures developed in use. However, by substituting a modified second tapered shim element 30' as shown in FIG. 8, a "full coverage" shim assembly can be provided. Second tapered shim element 30' is essentially identical to second tapered shim element 30 with regard to many features including dog 33 and connectors 36, but differs primarily with regard to extended annular surface 42 in which openings 14' are defined. Indicator 32' is functionally identical to indicator 32 but enclosed rather than open at the top. Extended surfaces 42 each start at step 44, adapted to fit sunken surface 24 of first tapered shim element 12, and continue the taper of [taper as] second tapered shim element 30. Spokes 46 partially defining openings 14' are frangible at sections 48 thereof. Thus second tapered shim element 30' functions much like second tapered shim element 30 of shim assembly [12] *10* except that, upon relative rotation, may be positioned with one or more of spokes 46 blocking an opening 14 of first tapered shim element 12 thereby preventing placement of shim assembly [12] *10* on vehicle bolts. This is simply remedied by removing the blocking spokes 46 at frangible sections 48 thereof. Since removal of spokes 46 is a functionally superfluous step, the embodiment of FIG. 1 is preferred.

Figure 10:
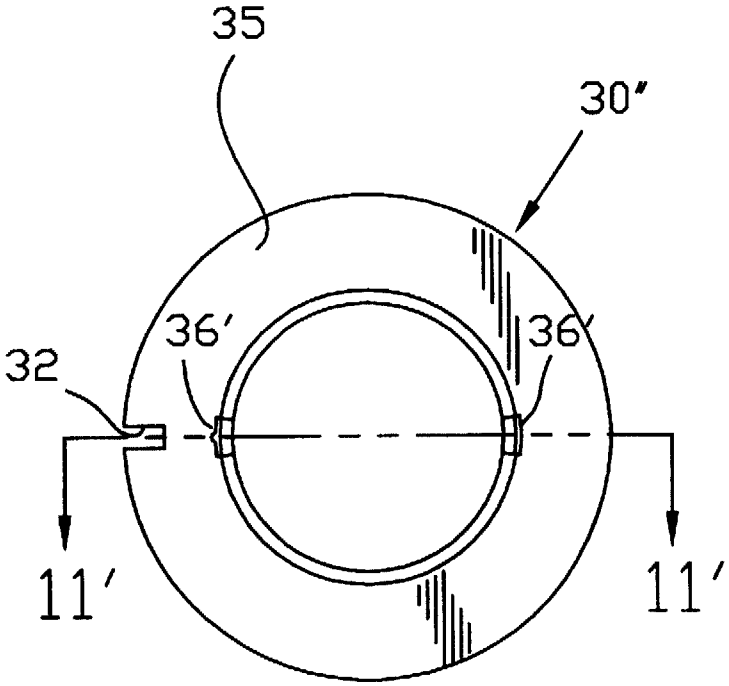
FIG. 10 is a front view of a shim element configured for use with the element of FIG. 9.
Figure 9:
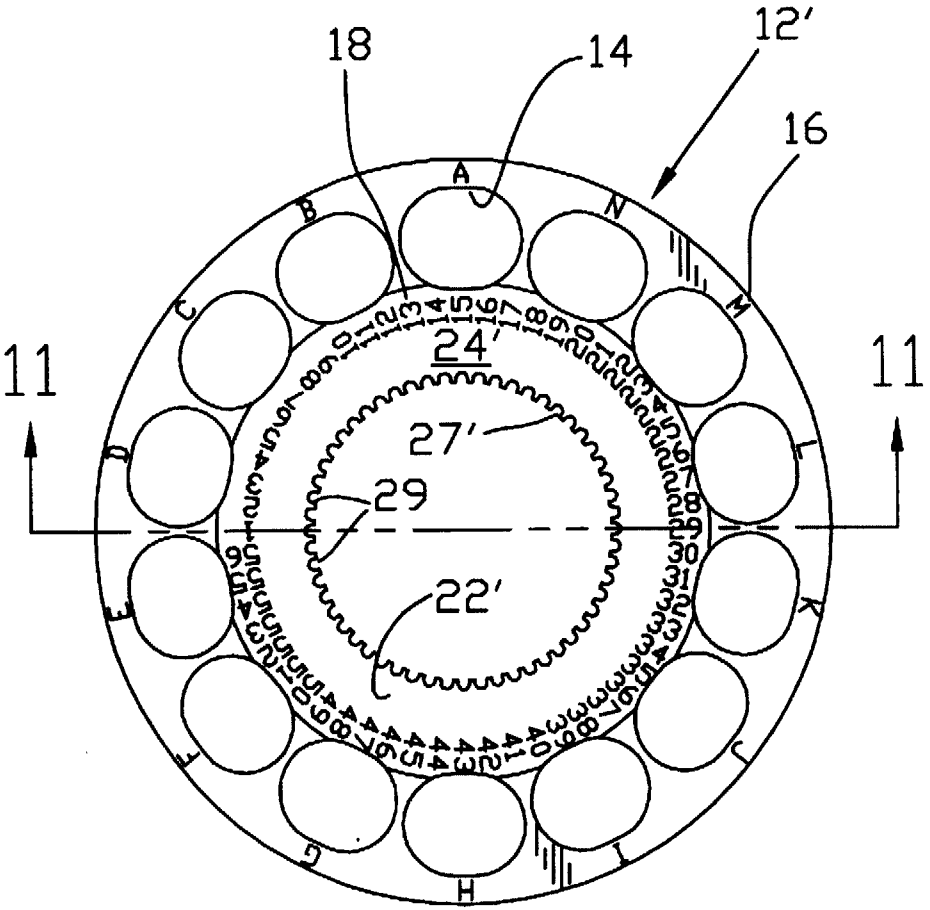
FIG. 9 is a front view of a shim element of yet another embodiment of the invention.
Figure 11:
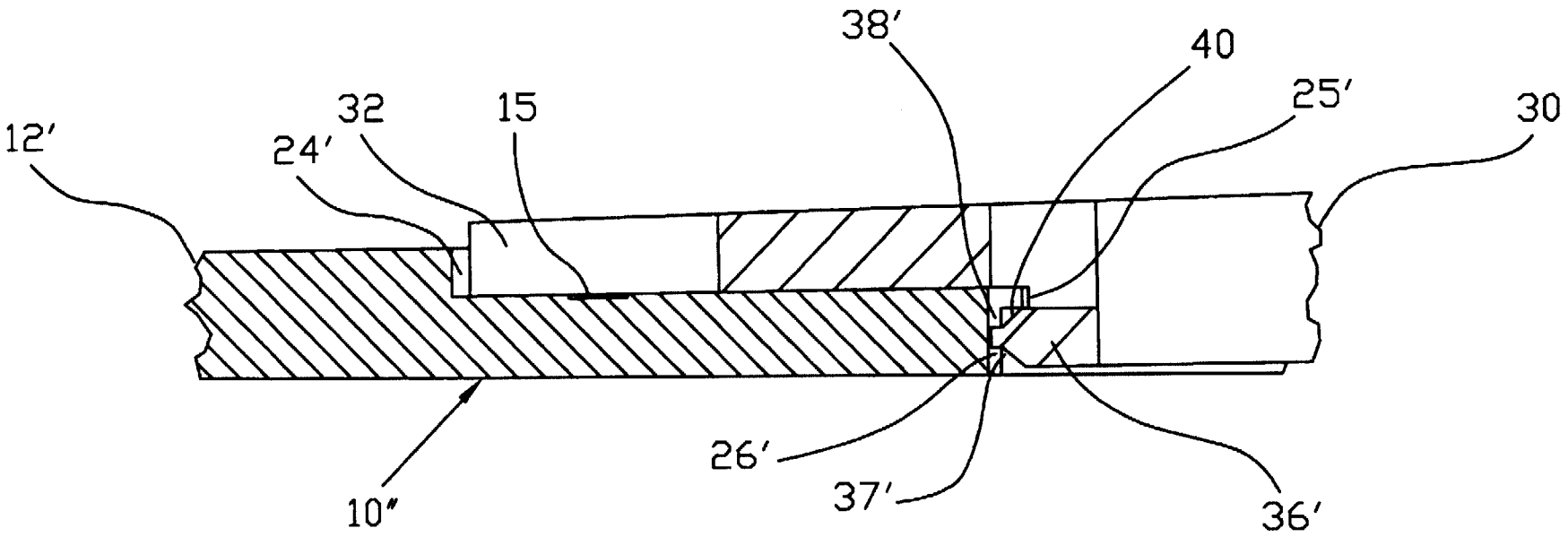
FIG. 11 is a partial view of a composite shim assembly of the sectioned shim elements of FIG. 9 and FIG. 10.
Figure 12:
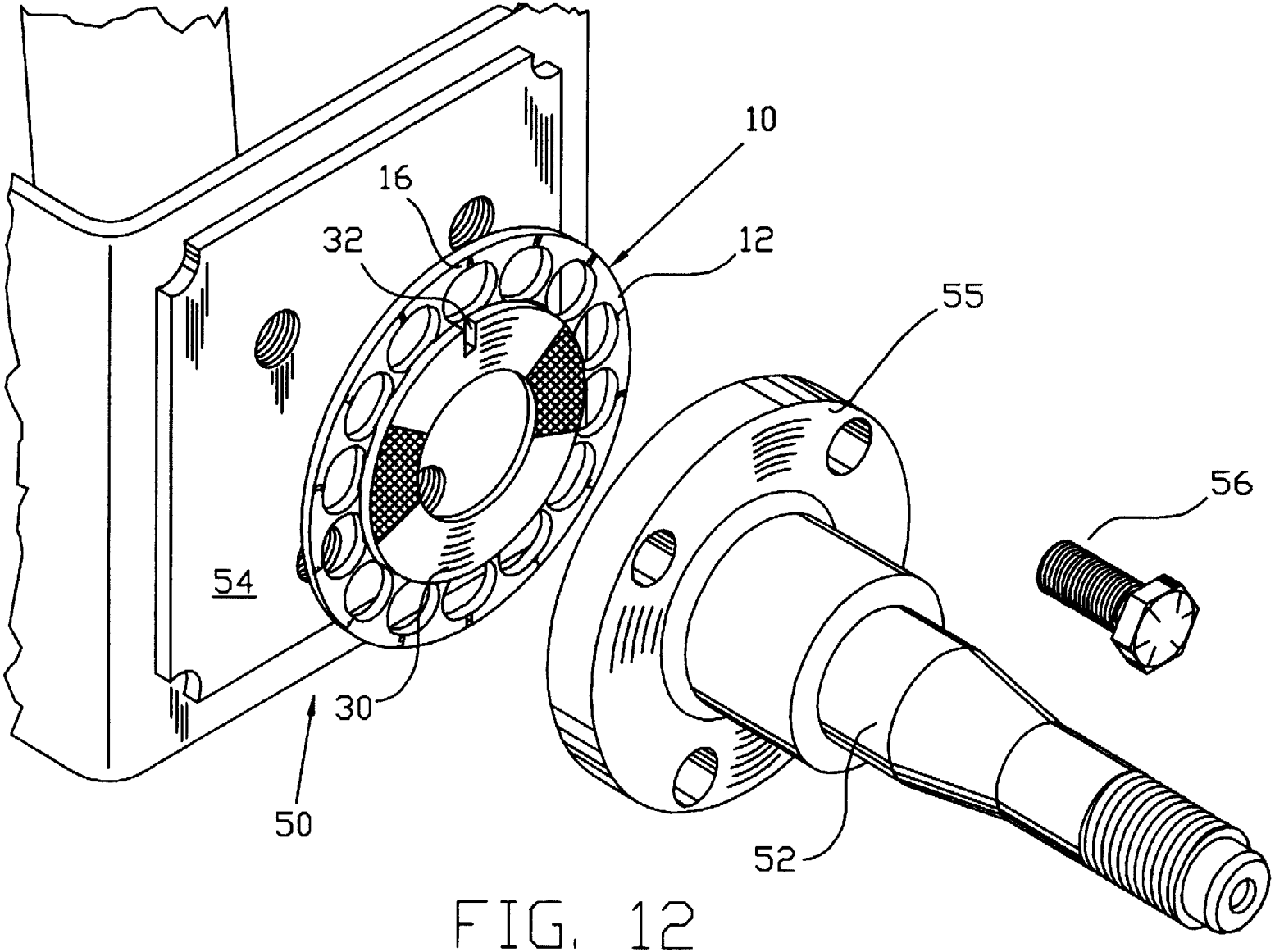
FIG. 12 is a view of a typical axle assembly into which the shim assembly of the present invention can be inserted to correct alignment.

Still another embodiment of the invention is illustrated in FIGS. 9 through 11. Again, shim elements 12' and 30" differ only in detail from the corresponding elements of the preferred embodiment. As shown in FIG. 9, shim Element 12' in that sunken surface 24' is bounded by central opening 27' which, in part, is defined by radial indents 29. Shim element 30", shown in FIG. 10, includes connectors 36' configured to engage radial indents 29. Thus when shim elements 12' and 30" are joined to form shim assembly 10" as shown in FIG. 11, ramp 37' of connector 36' distends connector 36' sufficiently to allow lip 25' to fit into groove 38' thereby securing shim element 12' to shim element 30". If desired, shim assembly 10" can be disassembled by reversing the procedure such that second ramp 40 will similarly distend connector 36' and release lip 25' from groove 38'. In practice, shim elements 12' and 30" are severally aligned with the appropriate taper indicia means 15 at indicator window 32. They are then snapped together to form shim assembly 10" with radial indents 29 cooperating with connectors 36' to preserve the relative angular relationship thereof and lip 25' in groove 38' serving to secure shim elements 12' and 30" axially. Once secured together, shim assembly [12'] *10"* is functionally identical with the preferred shim assembly [12] *10*.

A typical single item of shim assembly 10 of FIG. 1, when scaled to an outer diameter of 3.16 inches (8 cm) provides bolt coverage for 39 differing vehicle model applications through the typical one and one-half degree adjustment range. While specific vehicle application design is an iterative process in which mutually compatible applications, particularly bolt patterns, are determined essentially by trial and error, but four different configurations of the embodiment of shim assembly 10 have been found to cover 86 different models of vehicles in an initial study.

First tapered shim element 12 and second tapered shim element 30 can each be formed with the same taper. However, since a zero degree correction is seldom needed, it is preferable that the tapers of shim elements 12 and 30 differ. For the usual one and one-half degree total, a one-quarter degree difference in the tapers of shim elements 12 and 30 is desirable. Toe correction should be precise to at least one-sixteenth degree to minimize tire wear, but tire compliance is tolerant of camber misalignments of one eight-degree. Thus a composite shim assembly 10 taper of one-quarter degree can readily be position with one-eighth degree in the toe -or horizontal- orientation to correct toe misalignment greater than one-sixteenth degree, and the remainder of the taper resolved into camber change.

In use a vehicle rear wheel assembly 50 is examined on an alignment rack to determine toe and camber misalignment of a wheel (not shown) carried on spindle 52. The appropriate correction values are [the] *then* determined by a manual reference noting the side of the vehicle on which spindle 52 is mounted, or calculated by computer using an appropriate algorithm, and settings for taper indicia means 15 and shim assembly orientation indicia means 16 determined. Shim assembly 10 is then adjusted such that appropriate taper indicia 15 means appears in indicator window 32 and shim assembly 10 is [the] *then* installed in the vehicle between suspension plate 54 and spindle 55 mounted with selected orientation indicia means 16 facing outward and upward. Bolts 56 (one shown) are then properly torqued. Thus spindle 52 is adjusted by shim assembly 10 relative to suspension plate 54 such that toe and/or camber are correct. A single shim assembly 10 can be configured to cover the entire adjustment range and is easily and conveniently adjusted and installed. While suspension plate 54 is often mounted to an axle, it could of course be mounted to -or be- then hub carrier of a Chapman strut (not shown), or other suspension configuration.

Shim assembly 10 can be made of metal and/or polymeric materials. Glass-filled poly-caprolactam (nylon) is a particularly desirable one of the latter materials. Die casting or injection molding are useful forming processes which can accommodate connectors 36 without sectioning the dies or molds. Many other materials and forming processes will be apparent to those skilled in the art.

The above-described preferred variations on the subject shim assembly can be modified to numerous other embodiments if desired. The described and illustrated integral means of rotatably connecting the tapered shim elements is advantageous in that only the two elements are necessary. But the shim elements could be oriented as desired and then secured together, preferably in a releasable manner, in a fixed, nonrotatable relationship. The connecting means can alternatively be formed at the outer periphery of the shim assembly, or the elements can be formed without a central opening and rotatably or nonrotatably joined by a independent component such as a rivet or a bolt. In the simplest embodiment, two shim elements each defined at least in part by opposed flat tapered surfaces can be journalled together. The indicia means can appear on a separate template, or the taper indicia means can be calibrated to indicate actual taper in degrees. More than two shim elements can be used. The indicator cooperating with the taper indicia means could be any marking rather than the preferred window opening. By way of example, a spacer having a limited bolt hole pattern with but one opening per bolt and parallel sides can be joined with a rotatable tapered shim element rotatably secured to each side thereof. The amount and orientation of the shim assembly taper thus can be changed without the need to rotate the bolt hole pattern. These and other modifications can be readily accomplished as circumstances suggest.

Thus, although only a limited preferred embodiment and modification thereof has been described and illustrated in detail, it is anticipated that various other change and modifications will be apparent to those skilled in the art, and that such changes and modifications may be made without departing from the scope of invention as defined by the following claims.

What is claimed is:

1. A shim assembly for correcting misalignment of toe and/or camber of a vehicle wheel spindle extending from a mounting plate attached to a vehicle, the shim assembly comprising:

a first tapered shim element having opposed, nonparallel tapered surfaces;

a second tapered shim element having opposed, nonparallel tapered surfaces, at least a portion of one of the tapered surfaces of the first tapered shim element and at least a portion of one of the tapered surfaces of the second tapered shim element being adjacent to and in contact with each other, *and in which a plurality of spaced apart openings is defined through only one of the first and second tapered shim elements and the other of the first and second tapered shim elements is positioned inward of the openings*; and connecting means rotatably securing the first tapered shim element to the second tapered shim element for mutual rotation around a common axis, whereby the composite taper of the shim assembly may be varied by orienting the taper of the first tapered shim element relative to the taper of second tapered shim element.

[2. A shim assembly as set forth in claim 1 in which:

at least one of the-first and second tapered shim elements have defined therethrough a plurality of spaced apart openings.]

[3. A shim assembly as set forth in claim 2 in which:

only one of the first and second shim elements have the spaced opening defined therethrough, and the other of the first and second shim elements is positioned inward of the openings.]

4. A shim assembly as set forth in claim [2] *1* in which:

the openings in at least one shim element are closed.

5. A shim assembly as set forth in claim [2] *1* in which:

the openings in at least one shim element extend to the edge of the tapered shim element [and].

6. A shim assembly as set forth in claim [2] *1* in which:

the openings are arranged in a circular pattern concentric with the common axis.

7. A shim assembly as set forth in claim 1 in which:

taper display means are defined on the shim assembly to display the angular position of the taper of the first tapered shim element relative to the taper of the second tapered shim element, whereby the composite taper of the shim assembly can be determined.

8. A shim assembly as set forth in claim 7 in which: the taper display means include indicia means defined on one of the tapered shims and indicator means defined on the other to indicate the relative taper positions of the two shim elements and the resulting composite taper of the shim assembly.

9. A shim assembly as set for the in claim 8 in which:

the taper indicia means are markings arranged in a circular pattern and the indicator means are a window opening defined in the shim element through which a marking is displayed.

10. A shim assembly as set forth in claim 1 in which:

a dog projects from the adjacent surface of one of the shim elements; and a plurality of ramp-sided detents are defined in a circular pattern concentric with the common axis in the adjacent surface of the other of the shim elements and positioned to releasably receive the dog in one of the detents, whereby one shim element can be releasably secured in a selected engagement position relative to the other shim element.

11. A shim assembly as set forth in claim 10 in which:

taper indicia means are defined on one of the shim elements; and indicator means are defined on the other shim element with the indicia means and indicator means positioning corresponding to dog and detents engagement positions.

12. A shim assembly as set forth in claim 1 in which:

taper orientation indicia means are defined on the shim assembly to indicate the relative position of the composite taper of the shim assembly.

[13. A shim assembly as set forth in claim 1 in which the connecting means comprise:

an arcuate groove defined in one of the shim elements;

an arcuate lip defined in the other of the shim elements;

at least two opposed connectors positioned on one of the shim elements, one of the groove and lip being defined in the connectors on the shim element and the other of the groove and lip extending to engage the corresponding groove or lip at at least two opposed connectors at all rotational positions to secure the first and second shim elements together as a rotationally adjustable shim assembly.]

[14. A shim assembly as set forth in claim 13 in which:

the groove is defined in sections in the connectors and the lip extends as a full circle and is journalled in the groove sections.]

[15. A shim assembly as set forth in claim 13 in which:

at least one of the groove and lip have defined adjacent thereto a ramp portion.]

16. An adjustable shim assembly for correcting wheel alignment, the shim assembly comprising:

a first tapered shim element having opposed, at least partially flat, nonparallel surfaces;

a second tapered shim element having opposed, at least partially flat, nonparallel surfaces with at least one of the flat surfaces of the first tapered shim element being in contact with at least one of the flat surface of the second tapered shim element;

connecting means rotatably attaching the first tapered shim element to the second shim element for rotation around an axis perpendicular to the contacting surfaces of the first and second tapered shim elements; [and]

taper indicia means defined on the shim assembly to display the rotational position of the first tapered shim element relative to the second tapered shim element and thus the composite taper of the shim assembly*; and*

*releasable locking means for indexing and securing the first and second shim elements at positions corresponding to the taper indicia means.*

[17. An adjustable shim assembly as set forth in claim 16 in which:

taper display means are defined on the shim assembly to display the amount of composite taper of the shim assembly.]

18. An adjustable shim assembly as set forth in [claims] *claim* 16 [or 17] in which:

orientation indicia means are defined on the shim assembly to identify the relative direction of the composite taper of the shim assembly.

[19. An adjustable shim assembly as set forth in claim 16 in which:

releasable locking means for indexing and securing the first and second shim elements at positions corresponding to the taper display means.]

20. A method for compensating for wheel misalignment of camber and/or toe in a wheel carried on a spindle assembly releasably secured to [an] *a* suspension plate [at] *by fasteners connecting* abutting surfaces thereof, comprising:

measuring the misalignment of the wheel;

adjusting a shim assembly comprising two tapered shim elements rotatably attached one tapered shim element to the other tapered shim element around an axis of rotation, *one tapered shim element having spaced openings defined therethrough and the other tapered shim element being positioned inside of the openings,* by rotating [at least] one of the shim elements relative to the other to establish the desired corrective composite taper of the shim assembly;

positioning the adjusted shim assembly in a predetermined orientation between the suspension plate and the spindle assembly; and securing the spindle assembly to the suspension plate with the shim assembly therebetween *with the securing fasteners extending through the openings in one shim element* to reposition the wheel and spindle assembly relative to the suspension plate with the spindle in proper alignment.

21. A method for compensating for wheel misalignment as set forth in claim 20 in which:

the shim assembly includes taper indicia means defined on one shim element, and indicator means defined on the other shim element and the composite taper is determined by aligning selected of the taper indicia means with the indicator means.

22. A method for compensating for wheel misalignment as set forth in claim 21 in which:

the taper indicia means comprise a plurality of marking arranged in a circle and the indicator means comprise an opening defined in the shim element and the composite taper is determined by positioning a selected one of the markings in the [window] *opening*.

* * * * *